(12) United States Patent
Lee et al.

(10) Patent No.: US 12,235,607 B2
(45) Date of Patent: Feb. 25, 2025

(54) MACHINE LEARNING-BASED DIGITAL HOLOGRAPHY DEVICE AND METHOD FOR OPERATING SAME

(71) Applicant: POSTECH RESEARCH AND BUSINESS DEVELOPMENT FOUNDATION, Pohang-Si (KR)

(72) Inventors: Sang Joon Lee, Pohang-si (KR); Tae Sik Go, Pohang-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 176 days.

(21) Appl. No.: 18/015,139

(22) PCT Filed: Aug. 31, 2020

(86) PCT No.: PCT/KR2020/011619
§ 371 (c)(1),
(2) Date: Jan. 9, 2023

(87) PCT Pub. No.: WO2022/014772
PCT Pub. Date: Jan. 20, 2022

(65) Prior Publication Data
US 2023/0251603 A1 Aug. 10, 2023

(30) Foreign Application Priority Data
Jul. 16, 2020 (KR) ........................ 10-2020-0088205

(51) Int. Cl.
*G03H 1/00* (2006.01)
*G02B 21/00* (2006.01)
(Continued)

(52) U.S. Cl.
CPC ............ *G03H 1/0005* (2013.01); *G02B 21/12* (2013.01); *G03H 1/0443* (2013.01); *G06N 3/045* (2023.01);
(Continued)

(58) Field of Classification Search
CPC .. G02B 21/0008; G02B 21/12; G03H 1/0005; G03H 1/0443; G03H 1/0808;
(Continued)

(56) References Cited

U.S. PATENT DOCUMENTS
2019/0317451 A1    10/2019   Supikov et al.

FOREIGN PATENT DOCUMENTS
JP       2018-136767         8/2018
KR       20140122030 A   *  10/2014   ........... G03H 1/0011
(Continued)

OTHER PUBLICATIONS

Taesik Go, "Development of Digital Holographic Microscopy Combined with Artificial Intelligences", Doctoral Thesis, Department of Mechanical Engineering, Pohang University of Science and Technology (Feb. 2020).
(Continued)

*Primary Examiner* — Dakshesh D Parikh
(74) *Attorney, Agent, or Firm* — LEX IP MEISTER, PLLC

(57) ABSTRACT

A machine learning-based digital holography device and a method for operating same are disclosed. The digital holography method according to one embodiment comprises the steps of: obtaining an optical image including two-dimensional information about a sample; and on the basis of the optical image, generating a holographic image including three-dimensional information about the sample.

12 Claims, 13 Drawing Sheets

(51) Int. Cl.
  *G02B 21/12*  (2006.01)
  *G03H 1/04*  (2006.01)
  *G06N 3/045*  (2023.01)
  *G06N 3/08*  (2023.01)
  *G06T 7/50*  (2017.01)

(52) U.S. Cl.
  CPC .................. *G06N 3/08* (2013.01); *G06T 7/50* (2017.01); *G02B 21/0008* (2013.01); *G03H 2001/005* (2013.01); *G03H 2210/33* (2013.01); *G03H 2226/02* (2013.01); *G06T 2207/10056* (2013.01); *G06T 2207/20081* (2013.01); *G06T 2207/20084* (2013.01)

(58) Field of Classification Search
  CPC ........... G03H 1/0866; G03H 2001/005; G03H 2210/33; G03H 2222/12; G03H 2222/17; G03H 2226/02; G06N 3/045; G06N 3/0464; G06N 3/0475; G06N 3/08; G06N 3/094; G06T 2207/10056; G06T 2207/20081; G06T 2207/20084; G06T 7/50

See application file for complete search history.

(56) References Cited

FOREIGN PATENT DOCUMENTS

| | | | | |
|---|---|---|---|---|
| KR | 10-2018-0004635 | 1/2018 | | |
| KR | 10-2052902 | 12/2019 | | |
| KR | 10-2020-0072158 | 6/2020 | | |
| KR | 10-2020-0074443 | 6/2020 | | |
| KR | 20200074443 A * | 6/2020 | ............. | G06T 19/20 |
| WO | WO-2022002399 A1 * | 1/2022 | ....... | A61B 1/000096 |

OTHER PUBLICATIONS

Taesik Go et al., "Deep learning-based hologram generation using a white light source" Scientific reports 10.1 (Jun. 2, 2020): 1-12.

Hyeokjun Byeon et al., "Hybrid bright-field and hologram imaging of cell dynamics" Scientific reports 6.1 (Sep. 19, 2016): 1-6.

Agus Budi Dharmawan et al., "Artificial neural networks for automated cell quantification in lensless LED imaging systems" Multidisciplinary Digital Publishing Institute Proceedings 2.13 (Nov. 29, 2018): 989.

* cited by examiner

Scale bar:100μm

Scale bar:100μm

Scale bar:100μm

Scale bar:100μm

MACHINE LEARNING-BASED DIGITAL HOLOGRAPHY DEVICE AND METHOD FOR OPERATING SAME

TECHNICAL FIELD

Embodiments relate to a machine learning-based digital holographic apparatus and an operating method thereof.

BACKGROUND ART

Bright-field (BF) microscopy using a white light source is a widespread imaging technique used in various areas including industrial, biological, and medical fields. BF mages are commonly used to observe microscopic objects, such as contaminants, microorganisms and biological samples. However, detection and diagnostic accuracy is not so high, usually 90% or less. In addition, it is difficult to detect a sample located in a three-dimensional (3D) space, because BF images only provide intensity information on two-dimensional (2D) light of a sample within a shallow depth of focus, that is several micrometers ($\mu$m).

When a sample is irradiated with a coherent light, a hologram is generated by interference between an object wave and reference wave diffracted by the sample. The generated hologram includes 3D image information of the sample in the form of a 2D interference fringe. That is, digital holographic microscopy (DHM) is an imaging technique capable of obtaining optical properties of the sample in a 3D space, together with 3D positional and morphological information thereof, from a single hologram image. The DHM has been used in various fields including monitoring of biological samples or contaminants, analysis of 3D dynamic behaviors of particles and cells, and the like, because the 3D information on the samples can be noninvasively obtained from the hologram without any labeling and mechanical scanning process.

In order to obtain a hologram, expensive optical components, such as an expensive laser light source with excellent coherence, a high-quality spatial filter, mirror, and lens are required to induce diffraction and interference. Recently, deep learning is applied to DHM to enhance spatial resolution of hologram and improve numerical reconstruction process and phase information reconstruction algorithm, thereby being applied to biological sample classification and monitoring fields. However, no technique has been proposed to replace expensive lasers and optical components, which are fundamental technical limitations of the DHM.

DISCLOSURE OF THE INVENTION

Technical Goals

The following embodiments may provide a technique for obtaining 3D information of a sample by converting a white light-based BF image into a hologram image using machine learning.

However, the technical aspects are not limited to the aforementioned aspects, and other technical aspects may be present.

Technical Solutions

A digital holographic method according to an embodiment includes obtaining a bright-field (BF) image including two-dimensional (2D) information of a sample, and generating a hologram image including three-dimensional (3D) information of the sample based on the BF image.

The BF image may be captured by irradiating the sample with white light.

The generating may include generating the hologram image by inputting the BF image to a neural network.

The neural network may be trained based on a BF image and a hologram image obtained by simultaneously irradiating the same sample with white light and monochromatic light.

The digital holographic method may further include obtaining 2D positional information on the sample by projecting an image, which is obtained by numerically reconstructing the hologram image in the depth direction, onto one plane.

The digital holographic method may further include segmenting an image, which is obtained by numerically reconstructing the hologram image in the depth direction, based on the center of the sample, and obtaining an in-focus image of the sample and depth information of the sample based on sharpness of the segmented image.

The digital holographic method may further include obtaining a light scattering pattern by accumulating light intensity distributions of the hologram image in a depth direction, and extracting at least one of a real focal length or a virtual focal length of the sample based on the light scattering pattern.

A digital holographic apparatus according to an embodiment includes a memory comprising instructions, and a processor configured to execute the instructions. When the instructions are executed by the processor, the processor may be configured to generate a hologram image including 3D information of a sample based on a BF image including 2D information on the sample.

The BF image may be captured by irradiating the sample with white light.

The processor may be configured to train a neural network based on a BF image and a hologram image obtained by simultaneously irradiating the same sample with white light and monochromatic light.

The processor may be configured to obtain 2D position information on the sample by projecting an image, which is obtained by numerically reconstructing the hologram image in a depth direction, onto one plane.

The processor may be configured to segment an image, which is obtained by numerically reconstructing the hologram image in the depth direction, based on the center of the sample, and obtain depth information of the sample based on sharpness of the segmented image.

The processor may be configured to obtain a light scattering pattern by accumulating light intensity distributions of the hologram image in the depth direction, and extract at least one of a real focal length or a virtual focal length of the sample based on the light scattering pattern.

A training method of a digital holographic apparatus according to an embodiment may include obtaining a BF image and a first hologram image obtained by irradiating the same sample with white light and monochromatic light, generating a second hologram image based on the BF image through a first neural network, evaluating authenticity of the first hologram image and the second hologram image through a second neural network, and optimizing a loss function based on the first hologram image, the second hologram image, and a result of evaluating the authenticity.

The loss function may include a first loss function of the first neural network and a second loss function of the second neural network, and the optimizing may include adjusting weights of the first neural network and the second neural network such that the first loss function and the second loss function have minimum values, respectively.

A digital holographic apparatus according to an embodiment includes a memory comprising instructions, and a processor configured to execute the instructions. When the instructions are executed by the processor, the processor may be configured to obtain a BF image and a first hologram image obtaining by irradiating the same sample with white light and monochromatic light, generate a second hologram image based on the BF image through a first neural network, evaluate authenticity of the first hologram image and the second hologram image through a second neural network, and optimize a loss function based on the first hologram image, the second hologram image, and a result of evaluating the authenticity.

The loss function may include a first loss function of the first neural network and a second loss function of the second neural network, and the processor may be configured to adjust weights of the first neural network and the second neural network such that the first loss function and the second loss function have minimum values, respectively.

BEST MODE FOR CARRYING OUT THE INVENTION

Figure 1:
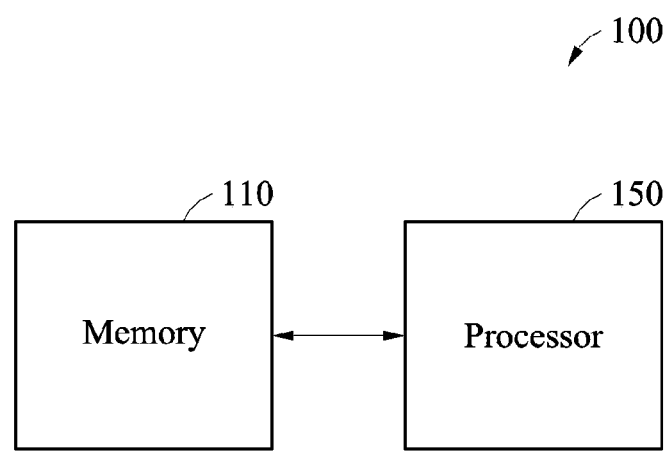
FIG. 1 is a block diagram schematically illustrating a digital holographic apparatus according to an embodiment.

Hereinafter, embodiments will be described in detail with reference to the accompanying drawings. However, various alterations and modifications may be made to the embodiments. Here, the embodiments are not construed as limited to the disclosure. The embodiments should be understood to include all changes, equivalents, and replacements within the idea and the technical scope of the disclosure.

The terminology used herein is for the purpose of describing particular embodiments only and is not to be limiting of the embodiments. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the embodiments with reference to the accompanying drawings, like reference numerals refer to like components and a repeated description related thereto will be omitted. In the description of embodiments, detailed description of well-known related structures or functions will be omitted when it is deemed that such description will cause ambiguous interpretation of the present disclosure.

In addition, terms such as first, second, A, B, (a), (b), and the like may be used to describe components of the embodiments. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

The same name may be used to describe an element included in the embodiments described above and an element having a common function. Unless otherwise mentioned, the descriptions of the embodiments may be applicable to the following embodiments and thus, duplicated descriptions will be omitted for conciseness.

FIG. 1 is a block diagram schematically illustrating a digital holographic apparatus according to an embodiment.

A digital holographic apparatus 100 may use machine learning to overcome technical limitations of conventional BF microscopy which provides insufficient information of a sample, and digital holographic microscopy (DHM) which requires precise collimated beam.

The digital holographic apparatus 100 may obtain three-dimensional (3D) information of a sample by using white light and detect the sample based on the 3D information. For example, the digital holographic apparatus 100 may obtain the 3D information of the sample based on a bright-field (BF) image captured by irradiating the sample with white light. In this case, the white light may include halogen lamps, LED lamps, smartphone flash, and the like.

The digital holographic apparatus 100 may generate a hologram image of the sample based on the BF image of the sample captured using white light. For example, the digital holographic apparatus 100 may convert a BF image which contain two-dimensional (2D) information on the sample into a hologram image including 3D information of the sample.

The digital holographic apparatus 100 may extract 3D information of the sample from the generated hologram image. For example, the digital holographic apparatus 100 may obtain the 3D image on the sample by numerically reconstructing the hologram image at various depths by applying a formula for diffraction of light.

The digital holographic apparatus 100 may convert a defocused BF image of a sample located at a certain depth into an equivalent hologram image by using a neural network, obtain the 3D information of the sample by using white light without using expensive optical components, and use the 3D information for sample detection.

The neural network may include a deep neural network (DNN). The neural network may include a convolutional neural network (CNN), a recurrent neural network (RNN), a perceptron, a feed forward (FF), a radial basis network (RBF), a deep feed forward (DFF), a long short-term memory (LSTM), a gated recurrent unit (GRU), an auto encoder (AE), a variational auto encoder (VAE), a denoising auto encoder (DAE), a sparse auto encoder (SAE), a Markov chain (MC), a Hopfield network (HN), a Boltzmann machine (BM), a restricted Boltzmann machine (RBM), a deep belief network (DBN), a deep convolutional network (DCN), a deconvolutional network (DN), a deep convolutional inverse graphics network (DCIGN), a generative adversarial network (GAN), a liquid state machine (LSM), an extreme learning machine (ELM), an echo state network (ESN), a deep residual network (DRN), a differentiable neural computer (DNC), a neural turning machine (NTM), a capsule network (CN), a Kohonen network (KN), and an attention network (AN).

The digital holographic apparatus 100 may include a memory 110 and a processor 150.

The memory 110 may store instructions (or programs) executable by the processor 150. For example, the instructions may include instructions for performing an operation of the processor 150 and/or an operation of each component of the processor 150.

The memory 110 may be embodied by a volatile or non-volatile memory device.

The volatile memory device may be implemented as a dynamic random access memory (DRAM), a static random access memory (SRAM), a thyristor RAM (T-RAM), a zero capacitor RAM (Z-RAM), or a twin transistor RAM (TTRAM).

The non-volatile memory device may be implemented as an electrically erasable programmable read-only memory (EEPROM), a flash memory, a magnetic RAM (MRAM), a spin-transfer torque-MRAM (STT-MRAM), a conductive bridging RAM (CBRAM), a ferroelectric RAM (FeRAM), a phase change RAM (PRAM), a resistive RAM (RRAM), a nanotube RRAM, a polymer RAM (PoRAM), a nano-floating gate memory (NFGM), a holographic memory, a molecular electronic memory device, or an insulator resistance change memory.

The processor 150 may process data stored in the memory 110. The processor 150 may execute a computer-readable code (e.g., software) stored in the memory 110 and instructions triggered by the processor 150.

The processor 150 may be a hardware-implemented data processing device having a physically structured circuit for executing desired operations. The desired operations may include, for example, codes or instructions included in a program.

The hardware-implemented data processing device may include, for example, a microprocessor, a central processing unit (CPU), a processor core, a multi-core processor, a multiprocessor, an application-specific integrated circuit (ASIC), and a field-programmable gate array (FPGA).

Figure 2:
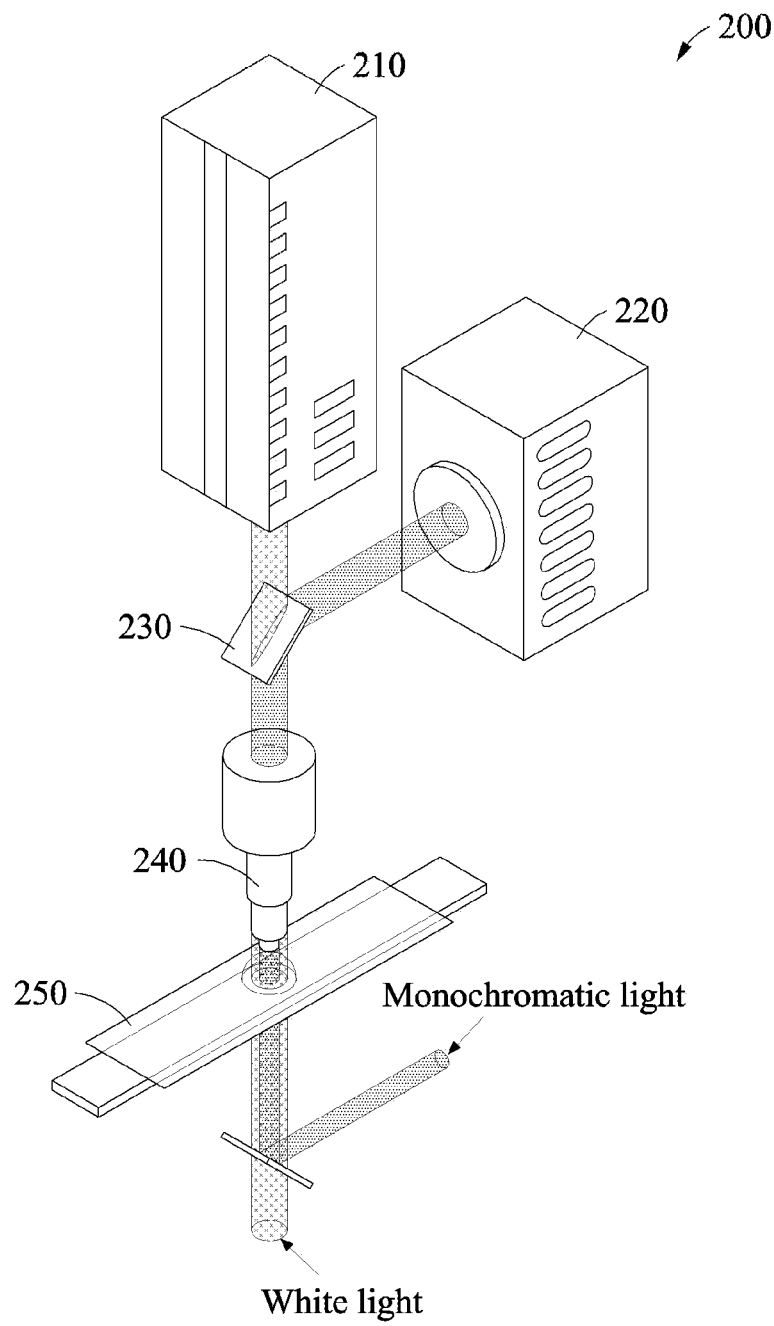
FIG. 2 is a diagram illustrating a hybrid imaging apparatus for generating training data for training the digital holographic apparatus shown in FIG. 1.
Figure 3A:
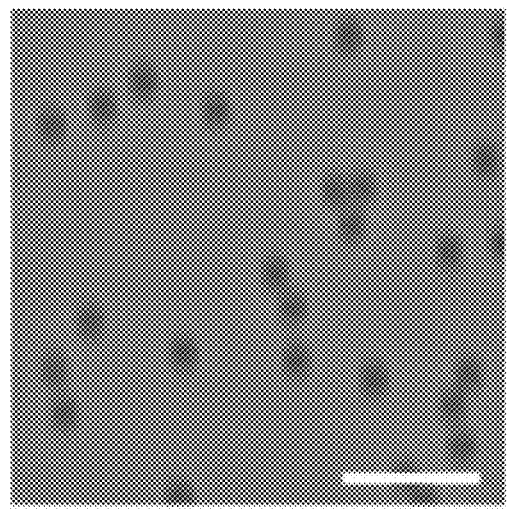
FIGS. 3A and 3B are diagrams illustrating training data generated by the hybrid imaging apparatus shown in FIG. 2.
Figure 3B:
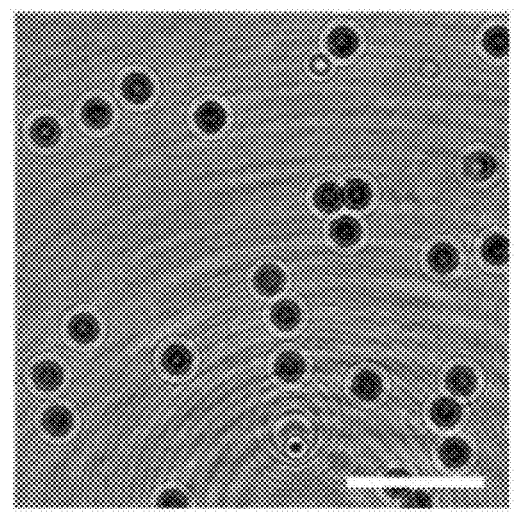

FIG. 2 is a diagram illustrating a hybrid imaging apparatus for generating training data for training the digital holographic apparatus shown in FIGS. 1, and 3A and 3B are diagrams illustrating training data generated by the hybrid imaging apparatus shown in FIG. 2.

A hybrid imaging apparatus 200 may generate training data used to train the digital holographic apparatus 100. For example, the hybrid imaging apparatus 200 may obtain a BF image of a sample and a hologram image corresponding to the BF image.

The hybrid imaging apparatus 200 may include a first camera 210, a second camera 220, a dichroic mirror 230, an objective lens 240, and a microchannel 250.

The hybrid imaging apparatus 200 may simultaneously irradiate a sample passing through the microchannel 250 with white light and monochromatic light. In this case, the monochromatic light may be collimated laser beam that has passed through a spatial filter.

The microchannel 250 may include a plurality of microchannels having inlets and separation portions. A sample may flow through the microchannel 250, and white light and monochromatic light may be irradiated to the sample flowing through the microchannel 250.

The objective lens 240 may magnify the hologram image and the BF image obtained by emitting white light and monochromatic light to the microchannel 250. The objective lens 240 may include a tube lens.

The dichroic mirror 230 may reflect light in a specific wavelength range and transmit other light beams. That is, the dichroic mirror 230 may transmit or reflect light according to the wavelength of light. The dichroic mirror 230 may reflect the monochromatic light toward the second camera 220 and transmit the white light toward the first camera 210.

The first camera 210 may obtain a BF image captured using white light. For example, the first camera 210 may obtain a BF image of a sample as shown in FIG. 3A.

The second camera 220 may obtain a hologram image captured using monochromatic light. For example, the second camera 220 may obtain a hologram image of a sample as shown in FIG. 3B.

The first camera 210 and the second camera 220 may be a charge-coupled device (CCD) camera or a complementary metal-oxide-semiconductor (CMOS) camera.

The BF image and the hologram image of the sample obtained by the hybrid imaging apparatus 200 may be used as training data of the digital holographic apparatus 100. The digital holographic apparatus 100 may be trained with a BF image and a hologram image of the same sample.

Figure 4:
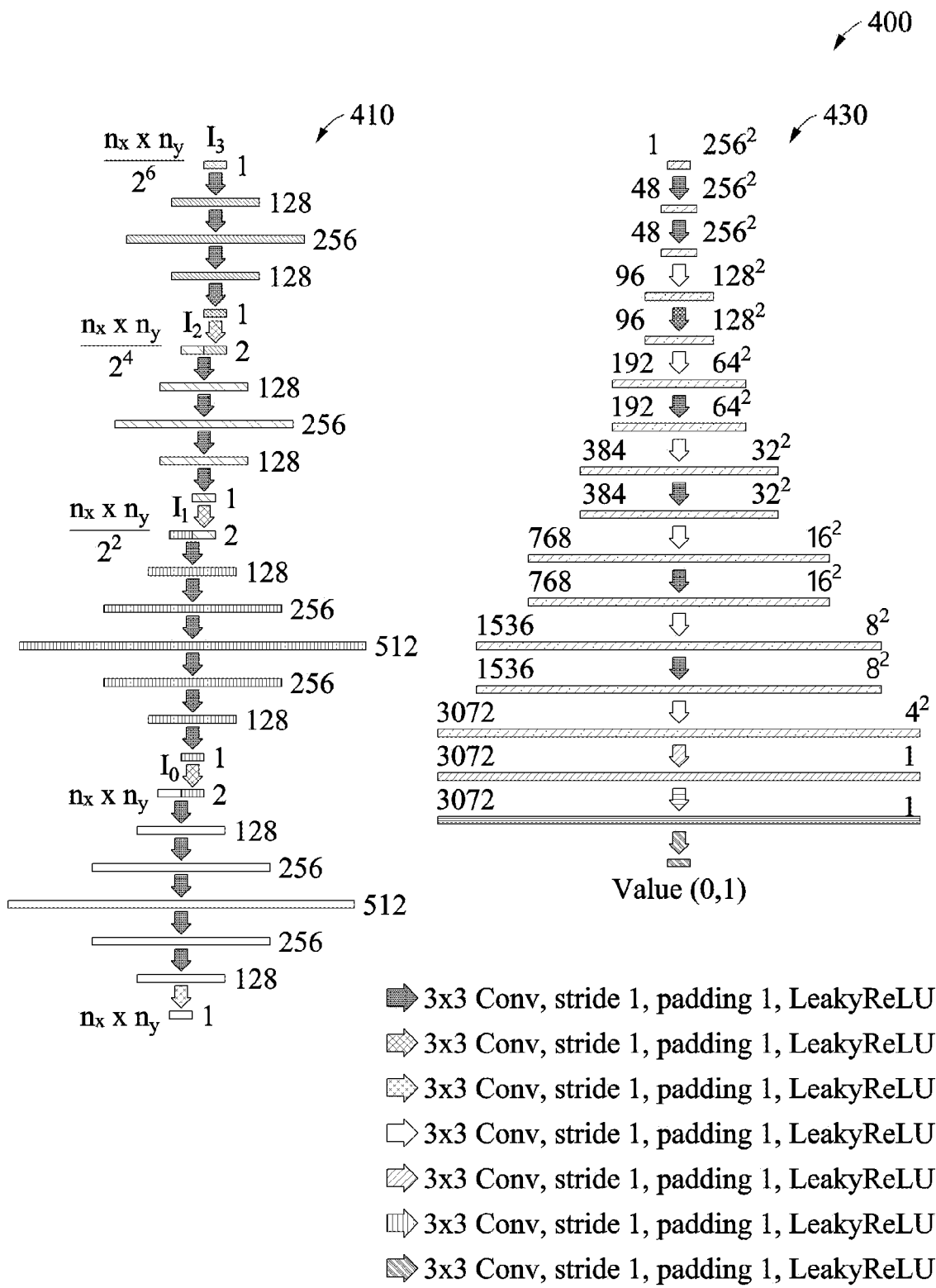
FIG. 4 is a diagram illustrating a network architecture included in the digital holographic apparatus shown in FIG. 1.
Figure 5:
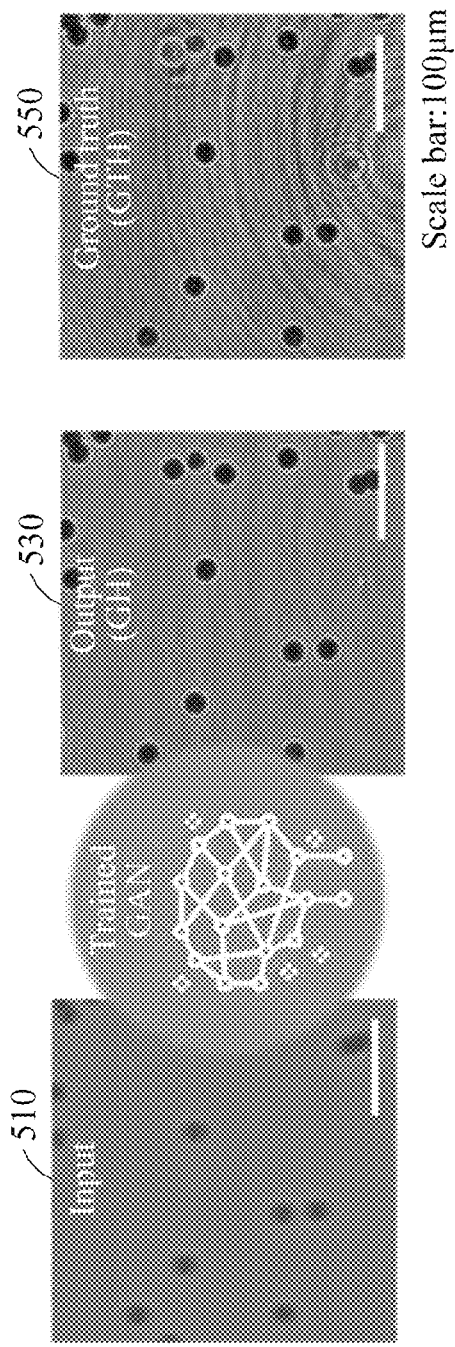
FIG. 5 is a diagram illustrating a hologram image generated by the digital holographic apparatus shown in FIG. 1.

FIG. 4 is a diagram illustrating a network architecture included in the digital holographic apparatus shown in FIG. 1 and FIG. 5 is a diagram illustrating a hologram image generated by the digital holographic apparatus shown in FIG. 1.

The digital holographic apparatus 100 may include a generative adversarial network (GAN). For example, the digital holographic apparatus 100 may convert a BF image into a hologram image using a GAN 400.

The GAN 400 may be trained based on the training data generated by the hybrid imaging apparatus 200. In a case of a BF image obtained using white light, as a depth coordinate of a sample increases due to a depth of focus according to magnification of the objective lens, signal intensity is weakened and the BF image may be blurred. In a case of a hologram image formed by the interference between an object wave and a reference wave, the object wave being diffracted by the sample by emitting coherent light and the reference wave not being transmitted through the sample, interference fringe spacing increases, as the depth coordinate of the sample increases. The GAN 400 may statistically learn a relationship between a BF image of a sample according to the depth and a hologram image corresponding to the BF image.

The GAN 400 may include a first neural network 410 and a second neural network 430. For example, the first neural network 410 may be a generator 410 and the second neural network 430 may be a discriminator 430.

The generator 410 may generate a new image based on an input image. For example, the generator 410 may generate a hologram image corresponding to a BF image based on the BF image among training images. The generator 410 may learn a multilayered structure such as the interference fringe in the BF image to have a network structure obtained by modifying a convolutional neural network (CNN) capable of generating a hologram image.

In FIG. 4, the numbers of feature maps or neurons may be values indicated on the left sides of the generator 410 and the discriminator 430. The sizes of the feature maps may be values indicated on the right sides of the generator 410 and the discriminator 430. Different colors of arrows may represent various types of connections. The merging of two blocks with different colors may indicate the connection of feature maps.

The discriminator 430 may evaluate authenticity of a hologram image generated by the generator 410 and/or a hologram image obtained based on the training image. For example, the discriminator 430 may be a CNN that determines authenticity of an actual hologram image and a generated hologram image, outputs a value close to 1, when it is determined that there is a high probability that the generated hologram image is the actual original hologram image, and outputs a value close to 0, when it is determined that there is a high probability that the generated hologram image is the generated hologram image.

The GAN 400 may attempt to optimize loss functions, opposite to each other, of the generator 410 and the discriminator 430 during the training process. For example, the generator 410 and the discriminator 430 may be trained to be adversarial to each other such that the generator 410 is trained so that the discriminator 430 may not discriminate the actual hologram image and the generated hologram image. The discriminator 430 is trained to increase probability of success in discrimination.

A loss function $L_G$ of the generator 410 and a loss function $L_D$ of the discriminator 430 may be expressed as Equations 1 and 2, respectively.

$$L_G = MSE(G(I), GT(I)) + BCE(D(G(I)), 1) \quad \text{[Equation 1]}$$

$$L_D = BCE(D(G(I)), 0) + BCE(D(GT(I)), 1) \quad \text{[Equation 2]}$$

G(I) and GT(I) represent the generated hologram image and the actual hologram image, respectively. D(G(I)) and D(GT(I)) represent output values when the generated hologram image and the actual hologram image are input to the discriminator 430. MSE (X, Y) and BCE (x, y) may be expressed as Equations 3 and 4, respectively.

$$MSE(X,Y) \sqrt{\sum_{i,j}^{n_x,n_y}(Y_{i,j} - X_{i,j})^2 / (n_x \times n_y)} \quad \text{[Equation 3]}$$

Here, $X_{i,j}$ and $Y_{i,j}$ in MSE(X, Y) represent values of a pixel (i, j) of images X $$BCE(x,y) = -y \log(x) - (1-y)\log(1-x) \quad \text{[Equation 4]}$$

and Y, respectively. In addition, $n_x$ and $n_y$ represent the number of image pixels of the images X and Y in x-axis and y-axis directions, respectively. x and y in BCE(x,y) represent values greater than or equal to 0 and less than or equal to 1.

The GAN 400 may train the generator 410 and the discriminator 430 such that the loss function $L_G$ of the generator 410 and the loss function $L_D$ of the discriminator 430 are minimized, respectively. For example, the GAN 400 may adjust respective weights of the generator 410 and the discriminator 430 such that the loss function $L_G$ and the loss function $L_D$ of the discriminator 430 are minimized, respectively.

The digital holographic apparatus 100 may convert a BF image 510 into a hologram image 530. For example, the digital holographic apparatus 100 may generate the hologram image 530 through the trained generator 410.

It may be confirmed that the hologram image 530 is generated similarly compared to an actual hologram image 550. Noise in the the hologram image 530 is reduced compared to the actual hologram image 550.

Figure 6:
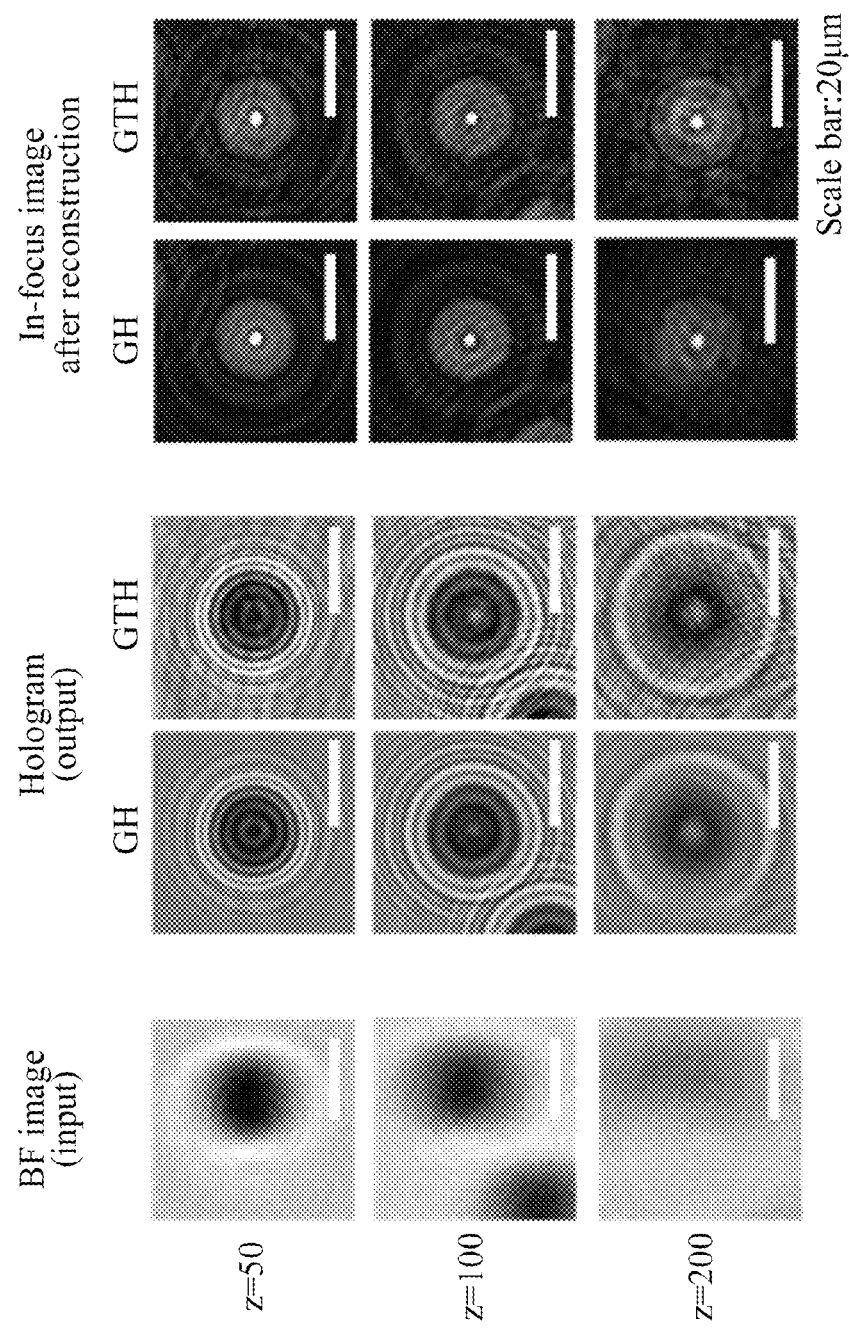
FIG. 6 is a diagram illustrating in-focus images obtained by numerically reconstructing hologram images generated by the digital holographic apparatus shown in FIG. 1.

FIG. 6 is a diagram illustrating in-focus images obtained by numerically reconstructing hologram images generated by the digital holographic apparatus shown in FIG. 1.

The digital holographic apparatus 100 may extract 3D information based on the generated hologram image. The digital holographic apparatus 100 may numerically reconstruct a hologram image along the optical axis direction. The optical axis direction here may be a depth direction of an image.

$$\Gamma(\xi, \eta, z) = \quad \text{[Equation 5]}$$
$$F^{-1}\left[F\{h(x, y, 0)\} \exp\left(iz\frac{2\pi}{\lambda}\sqrt{1 - \left(\frac{\lambda m}{M\Delta x}\right)^2 - \left(\frac{\lambda n}{N\Delta y}\right)^2}\right)\right]$$

A complex wavefield ($\Gamma(\xi,\eta,z)$) of a plane perpendicular to the optical axis direction may be expressed by Equation 5.

In Equation 5, F denotes the fast Fourier transform, $F^{-1}$ denotes the inverse fast Fourier transform, (x, y) denotes the coordinate system of a hologram image plane, ($\xi,\eta$) denotes the coordinate system of a reconstructed image plane, h(x, y, 0) denotes the hologram image information, z denotes the distance in a depth direction, $\lambda$ denotes the wavelength of light in a medium, M denotes the number of pixels of an image in the x direction, m is 0, 1, . . . , or M−1, N denotes the number of pixels of an image in the y direction, n is 0, 1, . . . , or N−1, and $\Delta x$ and $\Delta y$ denote the pixel sizes in the x and y directions in the image, respectively.

The digital holographic apparatus 100 may obtain complex wavefield information on a hologram image by numerical reconstructing the hologram image, and extract 2D and/or 3D information based on the complex wavefield information.

The digital holographic apparatus 100 may obtain an in-focus image of the sample by numerically reconstructing the hologram image.

Figure 7A:
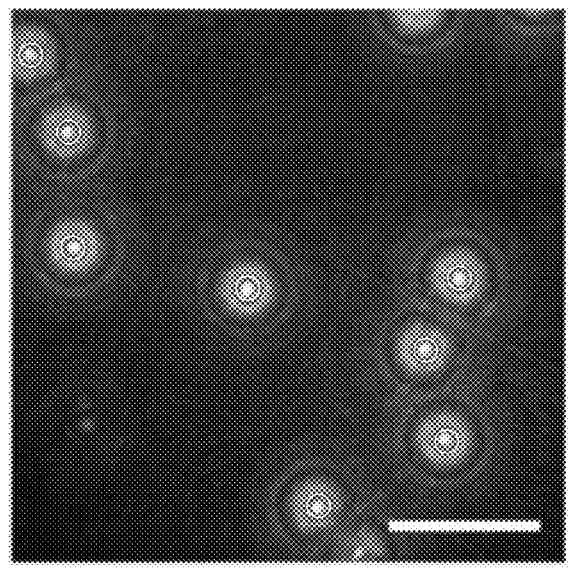
FIGS. 7A to 7C are diagrams for comparing pieces of two-dimensional information of samples obtained based on an actual hologram image and a hologram image generated by the digital holographic apparatus shown in FIG. 1, respectively.
Figure 7B:
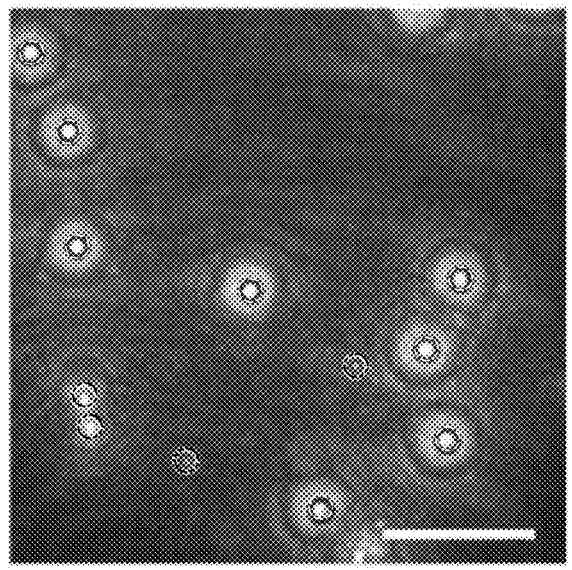
Figure 7C:
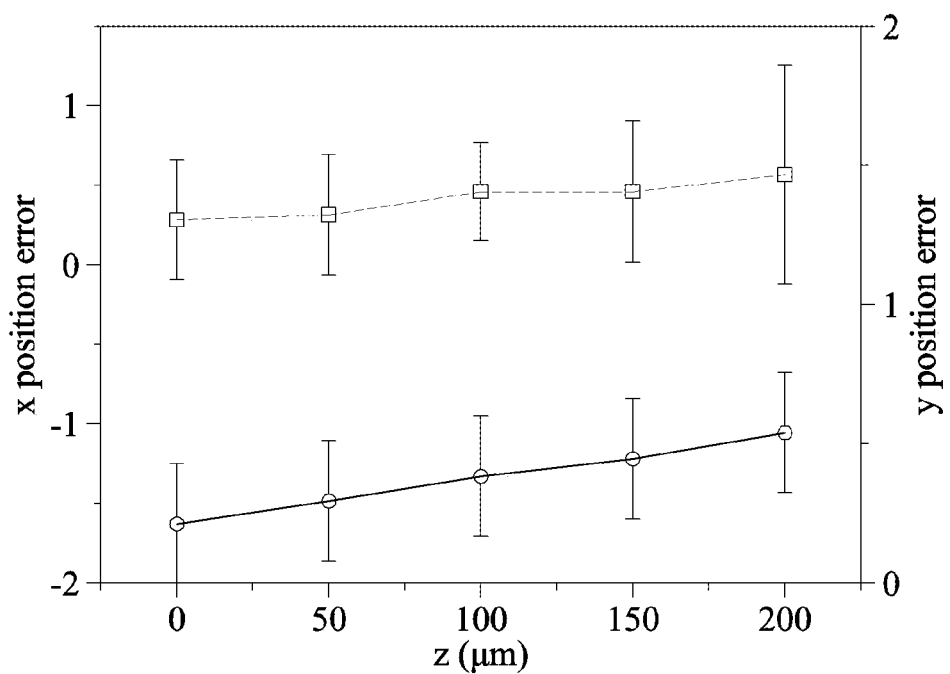

FIGS. 7A to 7C are diagrams for comparing the pieces of 2D information of the sample obtained based on the actual hologram image and the hologram image generated by the digital holographic apparatus shown in FIG. 1, respectively.

The digital holographic apparatus 100 may obtain 2D positional information of the sample. The digital holographic apparatus 100 may generate a local strong peak at the center of the sample due to a lens effect by projecting an image obtained by numerically reconstructing the generated hologram image onto one image plane. The digital holographic apparatus 100 may obtain 2D positional coordinates of the sample based on the generated peak.

FIG. 7A shows 2D coordinates of the sample obtained from the hologram image generated by the digital holographic apparatus 100, and FIG. 7B shows 2D coordinates of the sample obtained from the actual hologram image. Referring to FIG. 7C, it may be confirmed that the digital holographic apparatus 100 may obtain 2D coordinates of a sample similarly to the actual hologram image.

Figure 8A:
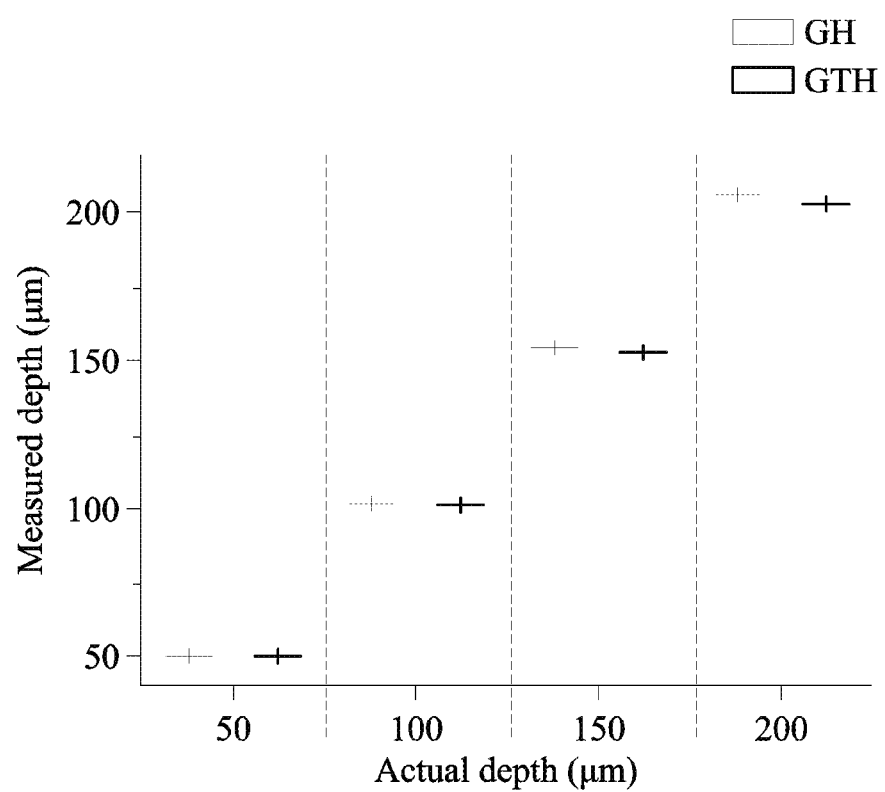
FIGS. 8A to 8C are diagrams for comparing pieces of three-dimensional information of samples obtained based on an actual hologram image and a hologram image generated by the digital holographic apparatus shown in FIG. 1, respectively.
Figure 8B:
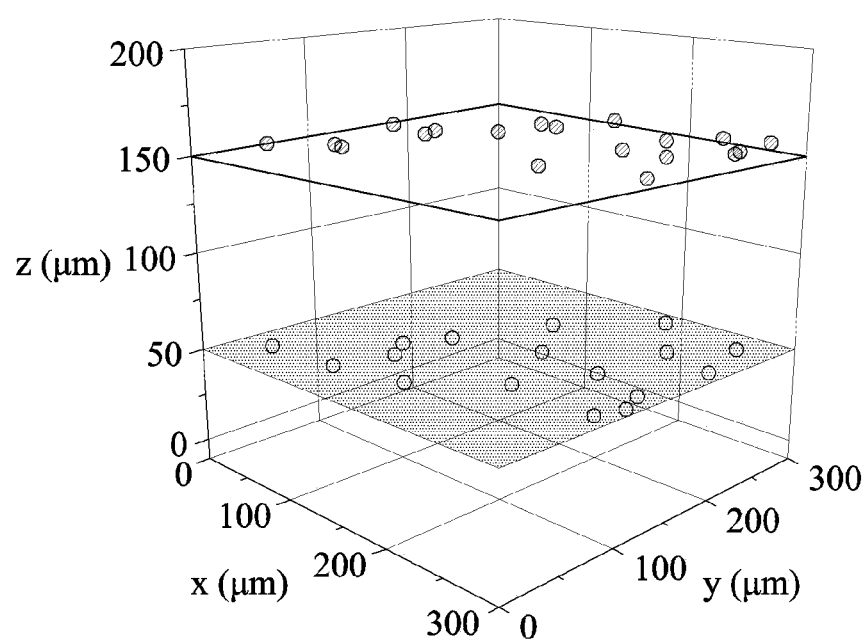
Figure 8C:
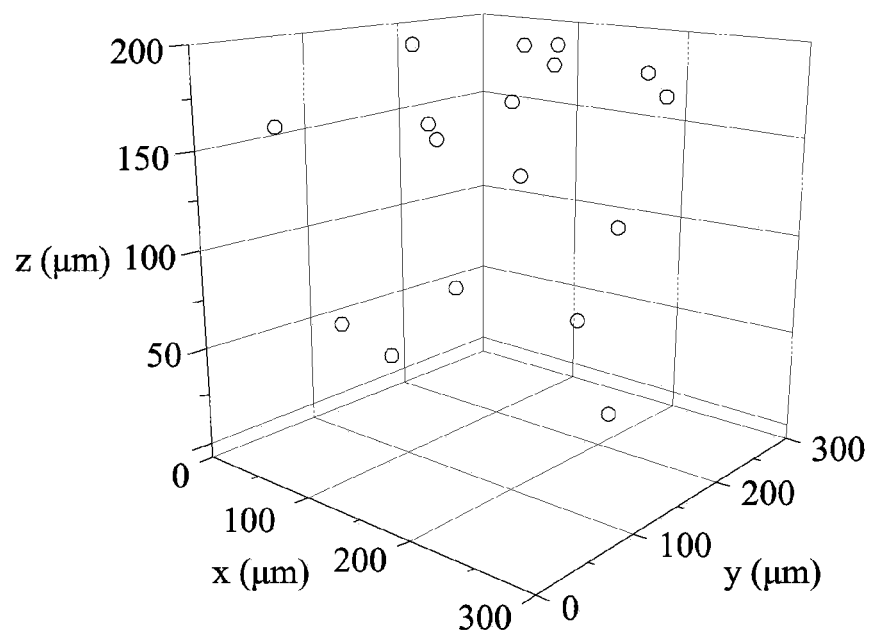

FIGS. 8A to 8C are diagrams for comparing the pieces of 3D information of the sample obtained based on the actual hologram image and the hologram image generated by the digital holographic apparatus shown in FIG. 1, respectively.

The digital holographic apparatus 100 may obtain depth information of a sample. For example, the digital holographic apparatus 100 may segment an image, which is obtained by numerically reconstructing the generated hologram image, based on the center of each sample, and obtain the depth coordinates of the sample based on image sharpness.

FIG. 8A is a graph showing a typical example of depth coordinates of a sample obtained based on a hologram image GH generated by the digital holographic apparatus 100 and an actual hologram image GTH, and it may be confirmed that the depth coordinates are similarly detected.

The digital holographic apparatus 100 may detect an object existing in a 3D space based on the detected 3D information of the sample. For example, the digital holographic apparatus 100 may detect positions of fine dust, erythrocytes, and/or platelets based on the detected 3D information of the sample.

FIGS. 8B and 8C show examples of detecting samples existing on one plane and samples randomly spread in a 3D space from a hologram converted from a BF image through the digital holographic apparatus 100, respectively.

Figure 9A:
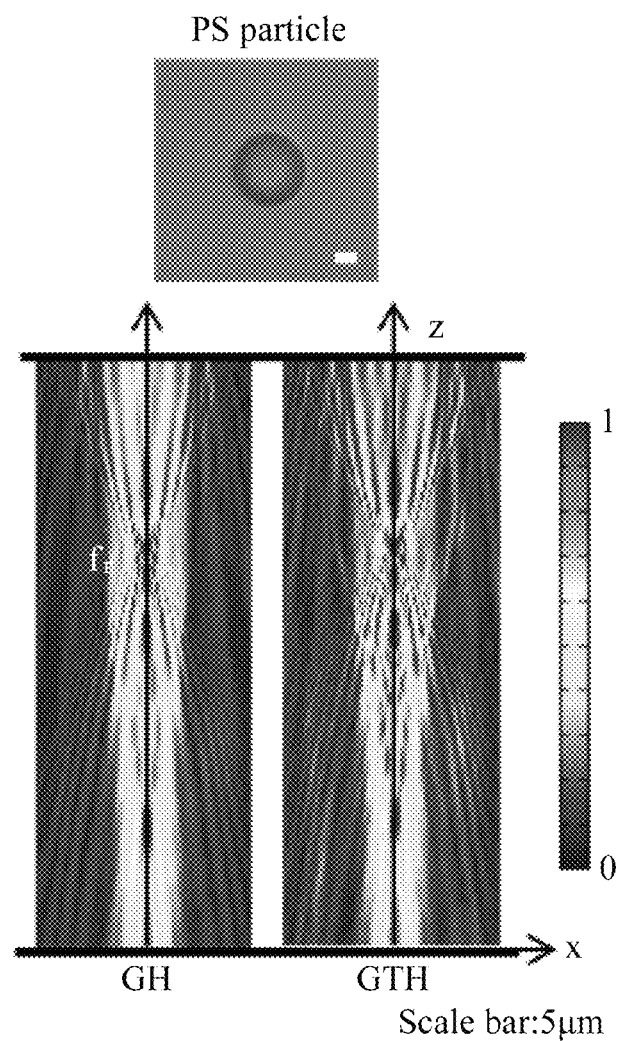
FIGS. 9A and 9B are diagrams illustrating light scattering patterns of samples obtained based on an actual hologram image and a hologram image generated by the digital holographic apparatus shown in FIG. 1, respectively.
Figure 9B:
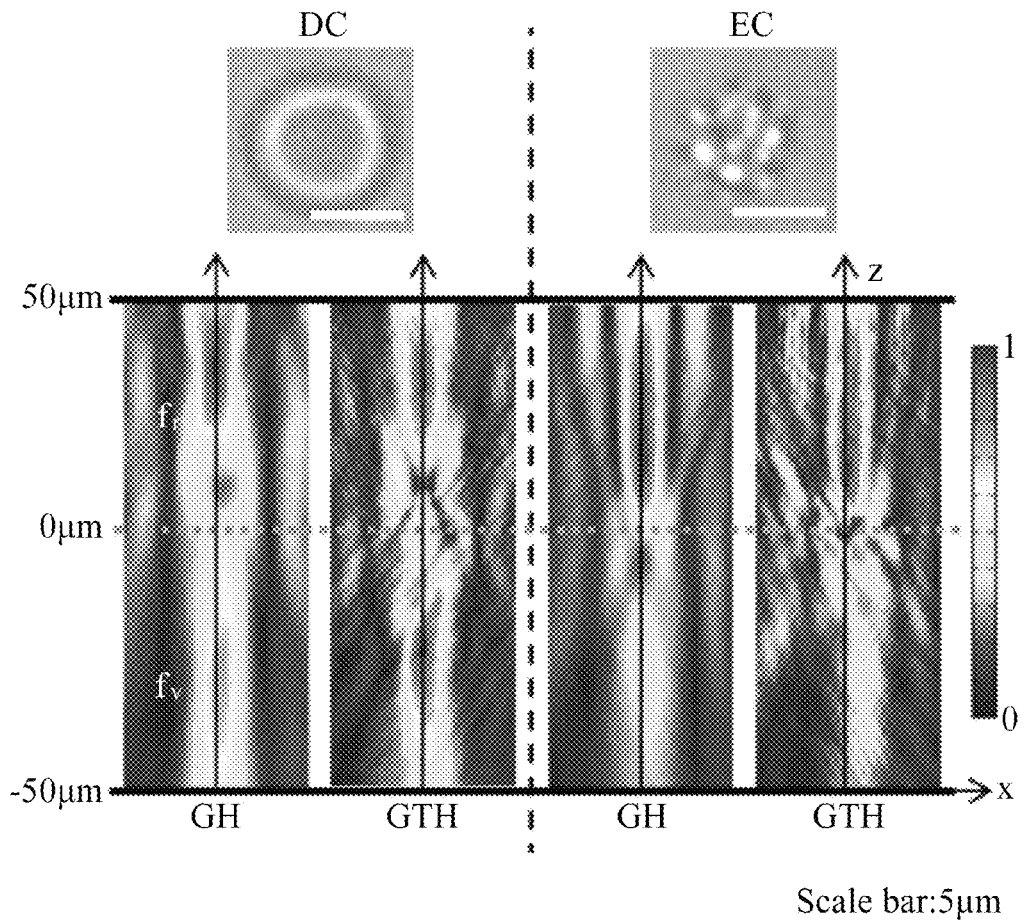

FIG. 9A is a diagram showing light scattering patterns of the sample obtained based on the hologram image generated by the digital holographic apparatus shown in FIG. 1 and the actual hologram image, respectively, and FIG. 9B is a diagram showing an example of light scattering patterns of discocyte (DC) and echinocyte (EC).

The digital holographic apparatus 100 may obtain a light scattering pattern by accumulating light intensity distributions at various depths along the depth direction. The light scattering pattern shows how light diverges and converges as it passes through a sample, and the light scattering pattern may vary depending on the morphological and optical characteristics of the sample.

FIG. 9A shows an example of light scattering patterns of polystyrene (PS) particles obtained based on the hologram image GH generated by the digital holographic apparatus 100 and the actual hologram image GT.

FIG. 9B shows examples of light scattering patterns of DC and EC, obtained from the hologram image GH generated by the digital holographic apparatus 100 and the actual hologram image GT.

The digital holographic apparatus 100 may classify the samples and detect morphological alterations thereof based on the light scattering pattern obtained from the generated hologram image. For example, the digital holographic apparatus 100 may extract classification features, such as a real focal length $f_r$ and a virtual focal length $f_v$ of a sample, by analyzing light scattering patterns.

The classification features extracted by the digital holographic apparatus 100 may be used for disease diagnosis and defect detection to improve diagnosis and detection accuracy.

The digital holographic apparatus 100 may generate a hologram image from a BF image of a sample based on general white light using deep learning. The digital holographic apparatus 100 may obtain a hologram image of a sample by using general white light without expensive laser or optical components, thereby obtaining 3D information of the sample with a simplified configuration of a digital holography microscope (DHM).

The digital holographic apparatus 100 may dramatically improve the accuracy of diagnosis of diseases and detection of contaminants and surface defects by using BF images, and thus, also be usefully used in basic scientific research such as analyzing the 3D dynamic behaviors of particles and cells. For example, the digital holographic apparatus 100 may measure the types and concentration distributions of fine particles including fine dust and/or contaminants. The digital holographic apparatus 100 may be used for analysis of 3D dynamic behaviors of blood cells and/or cells and diagnosis of disease. The digital holographic apparatus 100 may be used to measure surface properties, such as roughness or surface defects of an object surface.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random-access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The devices described above may be configured to act as one or more software modules in order to perform the operations of the embodiments, or vice versa.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software may also be distributed over network coupled computer systems so that the software is stored and executed in a distributed fashion. The software and data may be stored by one or more non-transitory computer readable recording mediums.

While the embodiments are described with reference to drawings, it will be apparent to one of ordinary skill in the art that various alterations and modifications in form and details may be made in these embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

Accordingly, other implementations are within the scope of the following claims.

The invention claimed is:

1. A digital holographic method including:
   obtaining a bright-field (BF) image comprising two-dimensional (2D) information of a sample; and
   generating a hologram image comprising three-dimensional (3D) information of the sample by inputting the BF image to a neural network, the neural network being trained by statistically learning a relationship between a training BF image according to a depth of a training sample and a corresponding training hologram image of the training sample.

2. The digital holographic method of claim 1, wherein the BF image is captured by irradiating the sample with white light.

3. The digital holographic method of claim 1, wherein the training BF image and the corresponding training hologram image are obtained simultaneously by illuminating the same training sample with white light and monochromatic beam at the same time.

4. The digital holographic method of claim 1, further comprising:
   obtaining 3D information of the sample by numerically reconstructing the hologram image in a depth direction.

5. The digital holographic method of claim 1, further comprising:
   obtaining a light scattering pattern by accumulating light intensity distributions of the hologram image in the depth direction; and
   extracting at least one of a real focal length or a virtual focal length of the sample, based on the light scattering pattern.

6. A digital holographic apparatus comprising:
   a memory containing instructions; and
   a processor configured to execute the instructions,
   wherein, when the instructions are executed by the processor, the processor is configured to:
   generate a hologram image comprising three-dimensional (3D) information of a sample by inputting bright-field (BF) image comprising two-dimensional (2D) information of the sample to a neural network, the neural network being trained by statistically learning a relationship between a training BF image according to a depth of a training sample and a corresponding training hologram image of the training sample.

7. The digital holographic apparatus of claim 6, wherein the BF image is captured by irradiating the sample with white light.

8. The digital holographic apparatus of claim 6, wherein the training BF image and the corresponding training hologram image are obtained simultaneously by illuminating the same training sample with white light and monochromatic light at the same time.

9. The digital holographic apparatus of claim 6, wherein the processor is configured to:
   obtain 3D information of the sample by numerically reconstructing the hologram image in the depth direction.

10. The digital holographic apparatus of claim 6, wherein the processor is configured to:
    obtain a light scattering pattern by accumulating light intensity distributions of the hologram image in the depth direction; and
    extract at least one of a real focal length or a virtual focal length of the sample based on the light scattering pattern.

11. The digital holographic method of claim 1, wherein the relationship includes a relationship between a degree of defocusing in the training BF image according to the depth and an interference fringe of the training hologram image.

12. The digital holographic apparatus of claim 6, wherein the relationship includes a relationship between a degree of defocusing in the training BF image according to the depth and an interference fringe of the training hologram image.

* * * * *